(12) United States Patent
Nakajima

(10) Patent No.: US 8,745,159 B2
(45) Date of Patent: Jun. 3, 2014

(54) NETWORK SYSTEM, CONTENT-REPRODUCTION-TAKEOVER METHOD, AND PROGRAM

(75) Inventor: Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 172 days.

(21) Appl. No.: 13/325,221

(22) Filed: Dec. 14, 2011

(65) Prior Publication Data

US 2012/0166581 A1 Jun. 28, 2012

(30) Foreign Application Priority Data

Dec. 27, 2010 (JP) ................................ P2010-289237

(51) Int. Cl.
*G06F 15/16* (2006.01)

(52) U.S. Cl.
USPC .......................................................... 709/217

(58) Field of Classification Search
USPC ................................................. 709/217, 219
See application file for complete search history.

(56) References Cited

U.S. PATENT DOCUMENTS

| 2010/0220769 A1* | 9/2010 | Sato ............................. 375/211 |
| 2011/0134338 A1* | 6/2011 | Toba ............................ 348/734 |
| 2011/0197237 A1* | 8/2011 | Turner .......................... 725/78 |

FOREIGN PATENT DOCUMENTS

| EP | 2152001 A1 | 2/2010 |
| WO | 2010042859 A1 | 4/2010 |

OTHER PUBLICATIONS

European Search Report EP 11194210, dated Feb. 16, 2012.

\* cited by examiner

*Primary Examiner* — Wing F Chan
*Assistant Examiner* — Andrew Woo
(74) *Attorney, Agent, or Firm* — Lerner, David, Littenberg, Krumholz & Mentlik, LLP

(57) ABSTRACT

According to an illustrative embodiment, an information processing apparatus is provided. The apparatus includes an input section configured to receive an instruction from a user to cause an other information processing apparatus to take over reproduction of content provided through a global network; and a sending section configured to transmit to the other information processing apparatus, when the instruction is received by the input section, a reproduction-takeover-command including content-access-information necessary to obtain the content from the global network.

9 Claims, 11 Drawing Sheets

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE Registration Identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | IPTV | DVI-Dual |
| 7 | Max_TMDS_Clock | | | | | | | |
| 8 | Latency field | I-Latency | HDMI_Video | Reserved (0) | | CNC (3) - CNC (0) | | |
| 9...N | Extention fields | | | | | | | |

| Opcode | Description | Operand | Length (Byte) |
|---|---|---|---|
| ... | ... | ... | ... |
| 0x07 | Tuner Device Status | [Tuner Device Info] | 8 |
| 0x08 | Give Tuner Device Status | [Status Request] | 1 |
| ... | ... | ... | ... |
| 0x8F | Give Device Power Status | | 0 |
| 0x90 | Report Power Status | [Power Status] | 1 |
| ... | ... | ... | ... |
| 0x92 | Select Analog Service | [Analoge Broadcast Type]<br>[Analogue Frequency]<br>[Broadcast System] | 4 |
| 0x93 | Select Digital Service | [Digital Service Identification] | 7 |
| 0x94 | Select Internet Service | [URL](ASCII) | 32 |
| ... | ... | ... | ... |

| Packet# | Byte # | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | |
| 0 | Seq#(1) | C0 | C1 | C2 | C3 | C4 | C5 | C6 | C7 | C8 | C9 | C10 | C11 | C12 | |
| 1 | Seq#(2) | C13 | C14 | C15 | C16 | C17 | C18 | C19 | C20 | C21 | C22 | C23 | C24 | C25 | |
| 2 | Seq#(3) | C26 | C27 | C28 | C29 | C30 | C31 | 0xFF | | | | | | | |

0x20 ≤ LC0...C31 ≤ 0x7E

```xml
<?xml version="1.0"?>
<root xmlns="urn:schemas-upnp-org:device-1-0">
    <specVersion>
        <major>1</major>
        <minor>0</minor>
    </specVersion>

<device>
        <deviceType>urn:schemas-upnp-org:device.MediaRenderer.1</deviceType>
        <friendlyName>DTV</friendlyName>
        <manufacturer>Sony Corporation</manufacturer>
        <manufacturerURL>http://www.sony.net/</manufacturerURL>
        <modelDescription>BRAVIA Digital Television</modelDescription>
        <modelName>KDL-46X</modelName>
        <modelNumber>100</modelNumber>
        <modelURL> http://www.sony.net/product/dtv/kdl46x1000.html</modelURL>
        <serialNumber>412651</serialNumber>
        <UDN>DummyUDN</UDN>
        <UPC>00000-00001</UPC>

<iconList>
            <icon>
                <mimetype>image/kdl46x.png</mimetype>
                <width>160</width>
                <height>160</height>
                <depth>8</depth>
                <url>http://192.168.0.xxx/image/kdl46x.png</url>
            </icon>
        </iconList>
        <serviceList>
            <service>
                <serviceType>urn:schemas-upnp-org:service:RenderingControl:1</serviceType>
                <serviceId>urn:upnp-org:serviceId:Rendering Control</serviceId>
                <controlURL>http://192.168.0.xxx/yyy.xml</controlURL>
                <eventSubURL>http://192.168.0.xxx/zzz.xml</eventSubURL>
            </service>
            <service>
                <serviceType>urn:schemas-upnp-org:service:ConnectionManager:1</serviceType>
                <serviceId>urn:upnp-org:serviceId:ConnectionManager</serviceId>
                <controlURL>http://192.168.0.xxx/vvv.xml</controlURL>
                <eventSubURL>http://192.168.0.xxx/www.xml</eventSubURL>
            </service>
            <service>
                <serviceType>urn:schemas-upnp-org:service:AVTransport:1</serviceType>
                <serviceId>urn:upnp-org:serviceId:AVTransport</serviceId>
                <controlURL>http://192.168.0.xxx/uuu.xml</controlURL>
                <eventSubURL>http://192.168.0.xxx/ttt.xml</eventSubURL>
            </service>
            <service>                                                                   ⎤ E
                <serviceType>urn:schemas-upnp-org:service:InternetTuner:1</serviceType>
                <serviceId>urn:upnp-org:serviceId:InternetTuner</serviceId>
                <controlURL>http://192.168.0.xxx/vvv.xml</controlURL>
                <eventSubURL>http://192.168.0.xxx/www.xml</eventSubURL>
            </service>
        </serviceList>

<presentationURL> </presentationURL>

</device>

</root>
```

FIG.9

```
<?xml version="1.0"?>
<scpd xmlns="urn:schemas-upnp-org:service-1-0">
    <specVersion>
        <major>1</major>
        <minor>0</minor>
    </specVersion>
    <actionList>
        <action>
            <name>SetAVTransportURI</name>; [Internet Content Definition] ---F₁
            <argumentList>
                <argument>                                                    ---F₂
                    <name>InstanceID</name>
                    <direction>in</direction>
                    <relatedStateVariable>A_ARG_TYPE_InstanceID</relatedStateVariable>; (Global Address + file name) ---F₃
                </argument>
            </argumentList>
        </action>
        <action>
            <name>Play</name>; [Internet Tuner Play Command] ---F₄
            <argumentList>
                <argument>                                                    ---F₅
                    <name>InstanceID</name>
                    <direction>in</direction>
                    <relatedStateVariable>A_ARG_TYPE_InstanceID</relatedStateVariable>; (Global Address + file name) ---F₆
                </argument>
                <argument>; (Continue content play position)
                    <name>AbsTime</name>
                    <direction>in</direction>
                    <relatedStateVariable>AbsoluteTimePosition</relatedStateVariable>; (Playback Position)
                </argument>                                                   ---F₇
            </argumentList>
        </action>
    </actionList>
</scpd>
```

FIG.10

NETWORK SYSTEM, CONTENT-REPRODUCTION-TAKEOVER METHOD, AND PROGRAM

CROSS-REFERENCE TO RELATED APPLICATION

The present application claims priority from Japanese Patent Application No. JP 2010-289237 filed in the Japanese Patent Office on Dec. 27, 2010, the entire content of which is incorporated herein by reference.

BACKGROUND

The present disclosure relates to a network system including a plurality of information processing apparatuses capable of obtaining content from a global network, content-reproduction-takeover method, and a program.

In recent years, DLNA (Digital Living Network Alliance: registered trademark) is known as the standard of constructing a domestic home network. Because of DLNA standard, digital content such as music data and moving image data are controlled in the home network.

For example, Japanese Patent No. 4281798 (hereinafter, referred to as Patent Document 1) describes a content-reproducing system that operates in a home network using DLNA standard. The content-reproducing system includes a controller, a server, and a renderer connected with each other via a home network.

Content to be reproduced is instructed by a user by using a controller. At this time, in a case where the controller is capable of reproducing the content, the controller obtains the content from the server and reproduces the content by itself. In a case where the controller is not capable of reproducing the content by itself, a renderer having a function to reproduce the content is instructed to reproduce the content. As a result, operability for users is improved (refer to paragraphs [0076], [0124], FIG. 2, and the like of Patent Document 1).

Further, in recent years, various standards of interfaces to transmit content to/from AV (Audio/Visual) apparatuses handling digital content are proposed. For example, IEEE (Institute of Electrical and Electronics Engineers) 1394 standard, HDMI (High-Definition Multimedia Interface: registered trademark) standard, and the like are widely known (for example, refer to FIG. 1, FIG. 2, and the like of Japanese Patent Application Laid-open No. 2007-267116 (hereinafter, referred to as Patent Document 2)).

It is assumed that a home gateway for connection with the Internet is set in the home network described in Patent Document 1. Further, it is assumed that the controller and the renderer are capable of accessing content in the Internet via the home gateway and displaying the content.

For example, it is assumed a case where content that the controller has been displayed and shown is changed to be displayed and shown by the renderer. However, in a home network using DLNA standard, content in a global address in the Internet may not be specified. Therefore, it is difficult to instruct the renderer to access content in a global address and display the content.

Further, in a case where a controller is connected with a renderer by using wired high-speed digital interfaces such as HDMI, content may be transmitted via the interfaces. However, in this case, it is necessary to adjust reproduction resolution for content between the both apparatuses, and there is a fear that the optimum display quality is not obtained.

SUMMARY

In view of the above-mentioned circumstances, it is desirable to provide a network system, a content-reproduction-takeover method, and a program capable of realizing user-friendly control of content in a global network, in a local network.

In view of the above, the present embodiments are provided. According to an illustrative embodiment, an information processing apparatus is provided. The apparatus includes an input section configured to receive an instruction from a user to cause an other information processing apparatus to take over reproduction of content provided through a global network; and a sending section configured to transmit to the other information processing apparatus, when the instruction is received by the input section, a reproduction-takeover-command including content-access-information necessary to obtain the content from the global network.

As described above, according to the present disclosure, content in a global network may be user-friendly controlled in a local network.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 6 is a diagram showing one example of "Vendor Specific" area shown in FIG. 5 in detail;

FIG. 7 are diagrams showing one example of an extended HDMI-CEC command of this embodiment;

FIG. 9 is a diagram showing an XML expression example describing functions that a device has, notified by using Discovery Advertisement or Discovery Response shown in FIG. 8;

FIG. 10 is a diagram showing a command example of an extended UPnP "AVTransport::Play( )" of this embodiment.

DETAILED DESCRIPTION OF EMBODIMENTS

Figure 1:
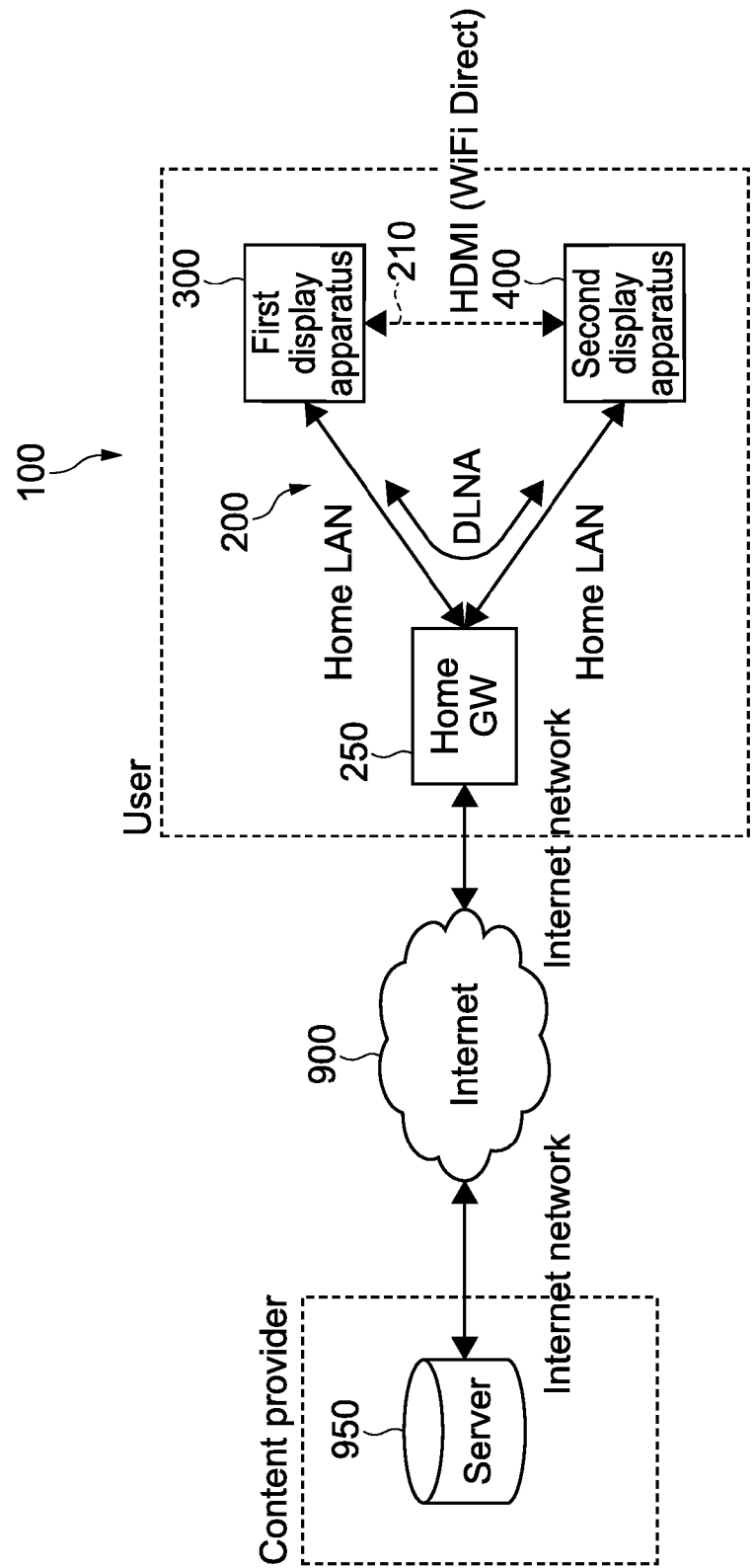
FIG. 1 is a diagram schematically showing a network system according to one embodiment of the present disclosure.

Hereinafter, an embodiment of the present disclosure will be described with reference to the drawings.
[Structure of Network System]
FIG. 1 is a diagram schematically showing a network system according to one embodiment of the present disclosure. FIG. 1 shows a network system 100, the Internet 900 as a global network, a server 950 as a source of content connected with the Internet 900 according to this embodiment.

The Internet 900 is typically a network using TCP/IP (Transmission Control Protocol/Internet Protocol). Alternatively, a global network using another protocol may be used.

In the server 950, various kinds of digital content such as still image data, moving image data, and music data are recorded. The server 950 is capable of supplying, for example, in response to a request from another information processing apparatus connected with the Internet 900, content to the other information processing apparatus via the Internet 900.

The network system 100 includes a home gateway 250 connecting the Internet 900 with a local network 200, and the first display apparatus 300 and the second display apparatus 400 as at least two information processing apparatuses. Each of the first and second display apparatuses 300 and 400 may be connected with the local network 200.

The local network 200 according to this embodiment is a network in conformity with DLNA standard. Further, the home gateway 250 and the first and second display apparatuses 300 and 400 are apparatuses that support DLNA standard.

In this embodiment, as the first display apparatus 300, a TV apparatus is used (hereinafter, referred to as TV apparatus 300). Further, as the second display apparatus 400, a mobile terminal is used (hereinafter, referred to as mobile terminal 400). Alternatively, as the first and second display apparatuses 300 and 400, for example, various information processing apparatuses such as PDAs (Personal Digital Assistants) such as mobile phones, PCs (Personal computer), and projector apparatuses may be used.

As shown in FIG. 1, the home gateway 250 is connected with the server 950 via the Internet 900. Therefore, the TV apparatus 300 and the mobile terminal 400 are capable of obtaining content that the server 950 stores via the home gateway 250 and reproducing the content. Note that the TV apparatus 300 and the mobile terminal 400 are also capable of obtaining content from other servers (not shown) connected with the home gateway 250 via the Internet 900.

Further, in this embodiment, the TV apparatus 300 is directly connected with the mobile terminal 400 by digital interfaces in conformity with HDMI standard and Wi-Fi standard. That is, as shown in FIG. 1, the PtoP connection 210 between the TV apparatus 300 and the mobile terminal 400 is constructed.

[TV Apparatus]

Figure 2:
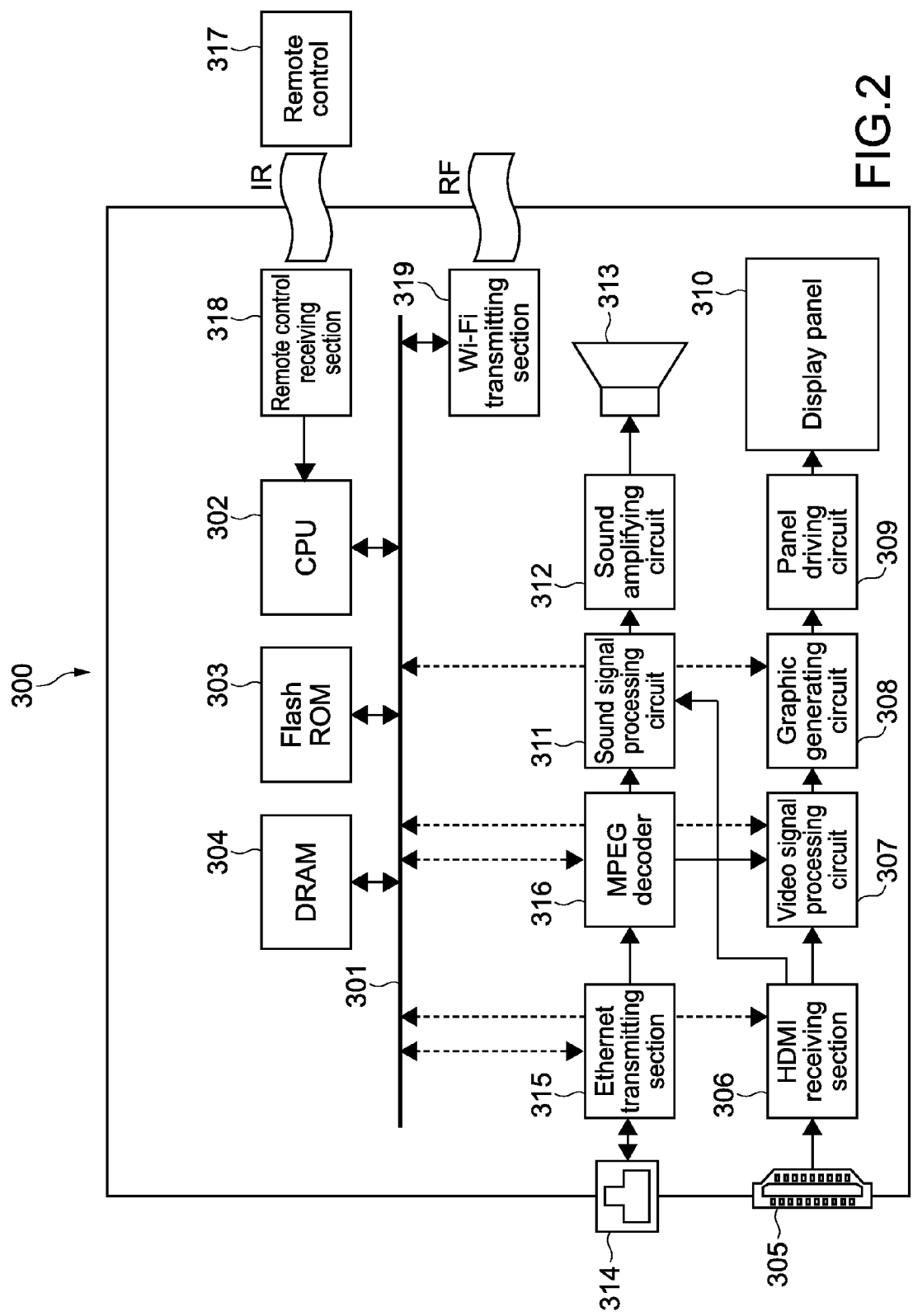
FIG. 2 is a block diagram schematically showing the structure of a TV apparatus shown in FIG. 1.

FIG. 2 is a block diagram schematically showing the structure of the TV apparatus 300 according to this embodiment. The TV apparatus 300 includes, to control the entire apparatus, a CPU (Central Processing Unit) 302, a Flash ROM (Flash Read Only Memory) 303, a DRAM (Dynamic Random Access Memory) 304, and the like connected with an internal bus 301.

The TV apparatus 300 includes an HDMI terminal 305 for receiving a baseband video/sound signal transmitted by the mobile terminal 400. The HDMI receiving section 306 separates the received baseband video/sound signal into a video signal, a sound signal, and a control signal.

The video signal generated by the HDMI receiving section 306 is input to the video signal processing circuit 307. Further, signal processing necessary for the video signal is performed. After that, On-Screen Display information generated by the graphic generating circuit 308 is superimposed on the video signal, and the signal is input to a panel driving circuit 309. Further, a video is displayed on a display panel 310 of the TV apparatus 300.

The sound signal generated by the HDMI receiving section 306 is input to a sound signal processing circuit 311. Further, signal processing necessary for the sound signal is performed. After that, the sound signal is amplified to a desired sound level by a sound amplifying circuit 312, and output to the loudspeaker 313. As a result, the loudspeaker 313 reproduces sounds.

The control signal generated by the HDMI receiving section 306 is output to the CPU 302 via the internal bus 301, and various processing is executed based on the control signal.

In this embodiment, an extended HDMI-CEC control signal as a reproduction-takeover-command (described later) is received by the HDMI receiving section 306 via the HDMI terminal 305. Further, the control signal is output to the CPU 302, and the reproduction-takeover-command is executed. That is, according to this embodiment, the HDMI receiving section 306 functions as a reproduction-takeover-command receiving section. Further, the CPU 302 functions as a command executing section.

The TV apparatus 300 includes a network terminal 314 to be connected with the local network 200. The network terminal 314 obtains content from the Internet 900.

The content input to the network terminal 314 is output to an Ethernet (registered trademark) transmitting section 315, and necessary packets are extracted by the Ethernet (registered trademark) transmitting section 315. Packets in relation with video/sound are input to an MPEG (Moving Picture Experts Group) decoder 316. The MPEG decoder 316 decodes the input packets to obtain video/sound signals, and outputs the respective signals to the video signal processing circuit 307 and the sound signal processing circuit 311. Further, according to the above-mentioned processing, a video is displayed on the display panel 310, and a sound is reproduced from the loudspeaker 313. The control packets in conformity with DLNA standard are output to the CPU via the internal bus 301, and various processing is executed.

An extended UPnP control message signal as another reproduction-takeover-command according to this embodiment is received by the Ethernet (registered trademark) transmitting section 315 via the network terminal 314. Further, the control message signal is output to the CPU 302, and the reproduction-takeover-command is executed. That is, the Ethernet (registered trademark) transmitting section 315 according to this embodiment functions as another reproduction-takeover-command receiving section. Further, the CPU 302 functions as a command executing section.

In this embodiment, a user may operate the TV apparatus 300 by a remote control 317. A control code sent by the remote control 317 is received by the remote control receiving section 318. The received control code is output to the CPU 302 connected with the internal bus 301 and deciphered, and the TV apparatus 300 is controlled.

Further, the TV apparatus 300 includes a Wi-Fi transmitting section 319. The Wi-Fi transmitting section 319 is used in a case where the TV apparatus 300 is PtoP connected to the mobile terminal 400 through Wi-Fi connection (hereinafter, the PtoP connection 210 will sometimes be referred to as Wi-Fi connection 210).

The extended UPnP control message signal as another reproduction-takeover-command according to this embodiment may be received by the Wi-Fi transmitting section 319. Further, the control message signal is output to the CPU 302, and the reproduction-takeover-command is executed. That is, the Wi-Fi transmitting section 319 according to this embodiment functions as still another reproduction-takeover-command receiving section. Further, the CPU 302 functions as a command executing section.

[Mobile Terminal]

Figure 3:
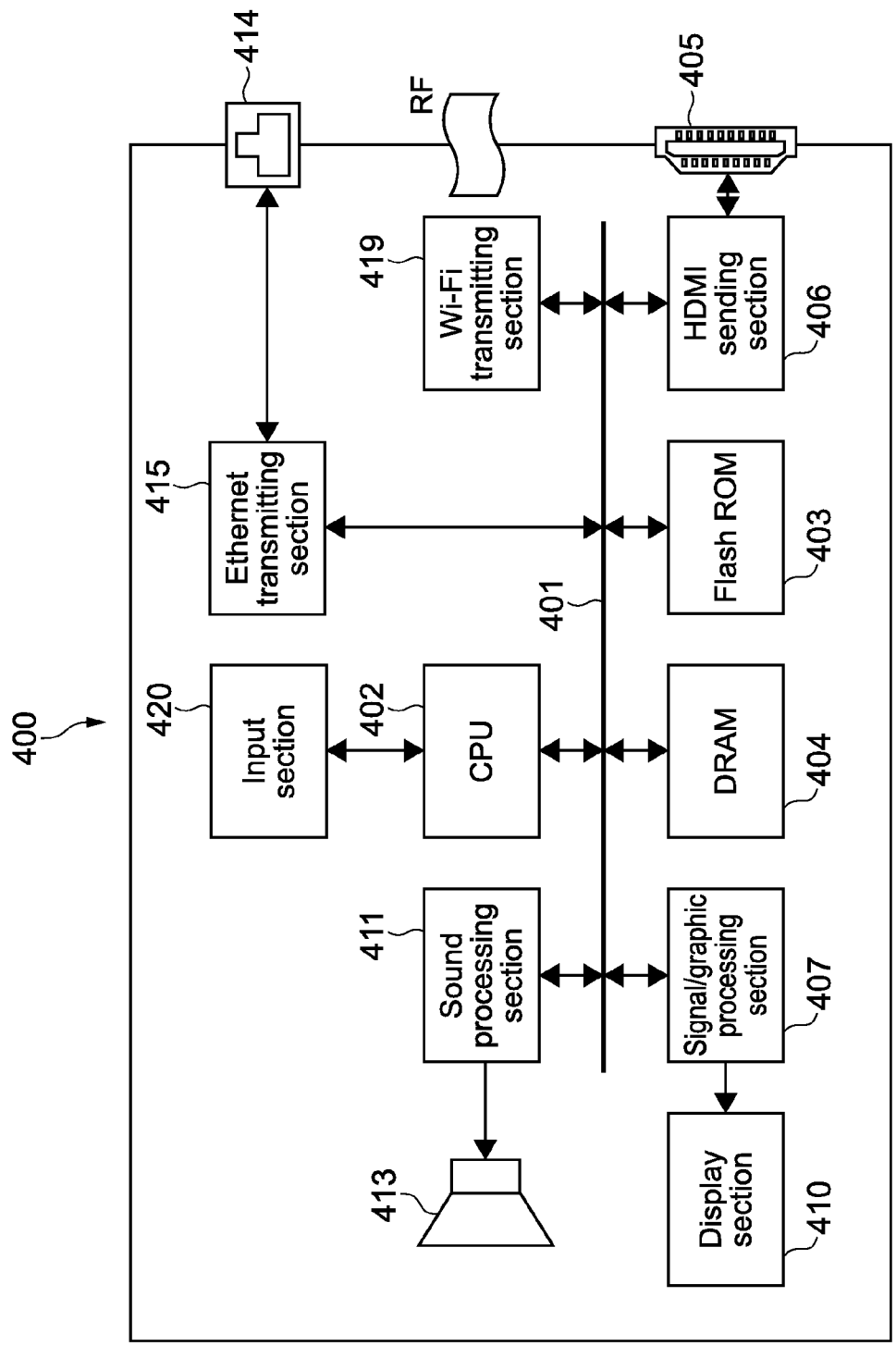
FIG. 3 is a block diagram schematically showing the structure of a mobile terminal shown in FIG. 1.

FIG. 3 is a block diagram schematically showing the structure of the mobile terminal 400 according to this embodiment. As the mobile terminal 400 according to this embodiment, it is assumed that an apparatus capable of displaying a video whose resolution is lower than that of the TV apparatus 300 shown in FIG. 2 or having a display section whose number of pixels is smaller than that of the TV apparatus 300 shown in FIG. 2 is employed. Therefore, as shown in FIG. 3, the mobile terminal 400 has the structure simpler than that of the TV apparatus 300.

As shown in FIG. 3, the mobile terminal 400 includes a CPU 402, a Flash ROM 403, a DRAM 404, and the like connected with an internal bus 401 to control the entire apparatus.

The mobile terminal 400 includes a network terminal 414 to be connected with the local network 200. The network terminal 414 obtains content from the Internet 900.

The content input to the network terminal 414 is output to an Ethernet (registered trademark) transmitting section 415, and necessary packets are extracted by the Ethernet (registered trademark) transmitting section 415. Packets in relation with video/sound are output to a signal/graphic processing section 407 via the internal bus 401. The signal/graphic processing section 407 decodes the input video packets, and causes a display section 410 to display them. Sound packets are output to a sound processing section 411 via the internal bus 401 and decoded, and reproduced by a loudspeaker 413.

The mobile terminal 400 includes an HDMI sending section 406 and an HDMI terminal 405. Via the HDMI sending section 406 and the HDMI terminal 405, the Internet content may be output to the TV apparatus 300.

The mobile terminal 400 includes an input section 420 that accepts an instruction by a user. The input section 420 includes, for example, various function keys such as numeric keys or character keys, a touchscreen, and the like.

The input section 420 accepts an instruction to cause the TV apparatus 300 as the other information processing apparatus to take over reproduction of content from a user. That is, an instruction to cause the TV apparatus 300 to display content is input by operating the input section 420 by a user. Then, the input instruction is processed by the CPU 402, and a control command is generated according to an operating procedure of the Flash ROM 403 and the DRAM 404.

As described above, the extended HDMI-CEC control signal as a reproduction-takeover-command according to this embodiment is generated by the CPU 402. Further, the extended HDMI-CEC control signal is transmitted to the TV apparatus 300 by the HDMI sending section 406 via the HDMI terminal 405. That is, in this embodiment, the HDMI sending section 406 functions as a reproduction-takeover-command sending section.

The extended UPnP control message signal as another reproduction-takeover-command according to this embodiment is also generated by the CPU 402. Further, the extended UPnP control message signal is transmitted to the TV apparatus 300 via the internal bus 401, the Ethernet (registered trademark) transmitting section 415, and the network terminal 414. That is, in this embodiment, the Ethernet (registered trademark) transmitting section 415 functions as another reproduction-takeover-command sending section.

Further, the mobile terminal 400 includes a Wi-Fi transmitting section 419. The extended UPnP control message signal as another reproduction-takeover-command according to this embodiment may be transmitted to the TV apparatus 300 via the internal bus 401 and the Wi-Fi transmitting section 419. That is, in this embodiment, the Wi-Fi transmitting section 419 functions as still another reproduction-takeover-command sending section.

[Behavior of Network System]

Figure 4:
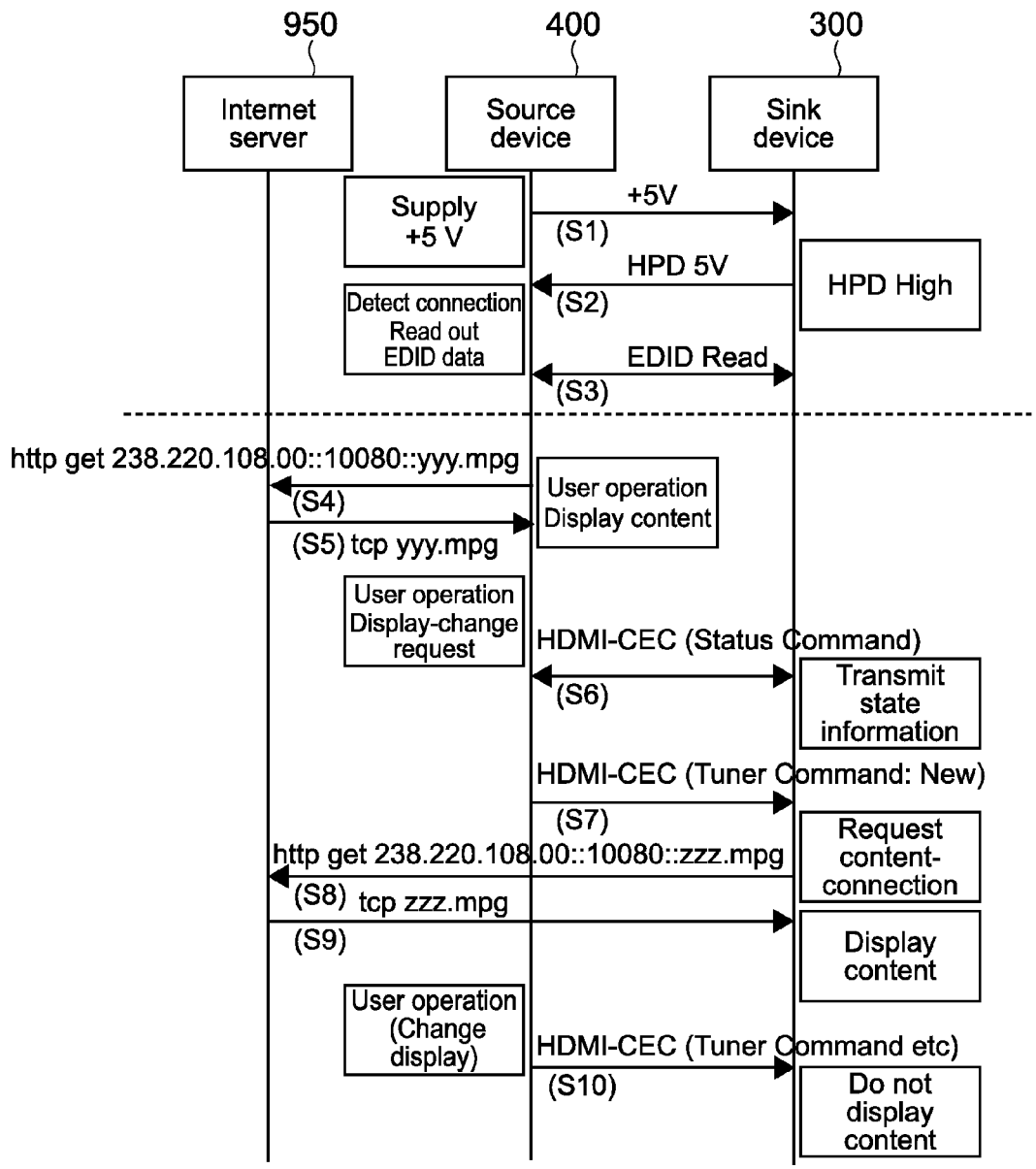
FIG. 4 is a sequential diagram schematically showing a control-sequential example between the TV apparatus and the mobile terminal using HDMI-CEC in the network system shown in FIG. 1.

FIG. 4 is a sequential diagram schematically showing a control-sequential example between the TV apparatus 300 and the mobile terminal 400 using HDMI-CEC in the network system according to this embodiment.

Here, the TV apparatus 300 serves as a sink device, and the mobile terminal 400 serves as a source device. Hereinafter, the TV apparatus 300 will sometimes be referred to as sink device 300, and the mobile terminal 400 will sometimes be referred to as source device 400.

Through the PtoP connection 210 of HDMI, the source device 400 is capable of transmitting content and the like to the sink device 300. In this embodiment, as described in the following, the reproduction-takeover-command is transmitted from the source device 400 to the sink device 300. Further, the sink device 300 is capable of accessing the server 950 in the Internet 900 by itself and obtaining content.

First, the source device 400 supplies 5 V power to the sink device 300 by using Pin 18 of HDMI (Step 1). The sink device 300 turns the HPD (Hot Plug Detect) line of Pin 19 to 5 V by using the supplied 5 V power. Further, the sink device 300 notifies the source device 400 that HDMI connection has been established (Step 2).

When the HPD line is turned to 5 V, the source device 400 reads out EDID (Extended display identification data) that the sink device 300 has (Step 3). As a result, the source device 400 may determine if the sink device 300 is capable of accessing content in the Internet 900 and displaying the content.

Figure 5:
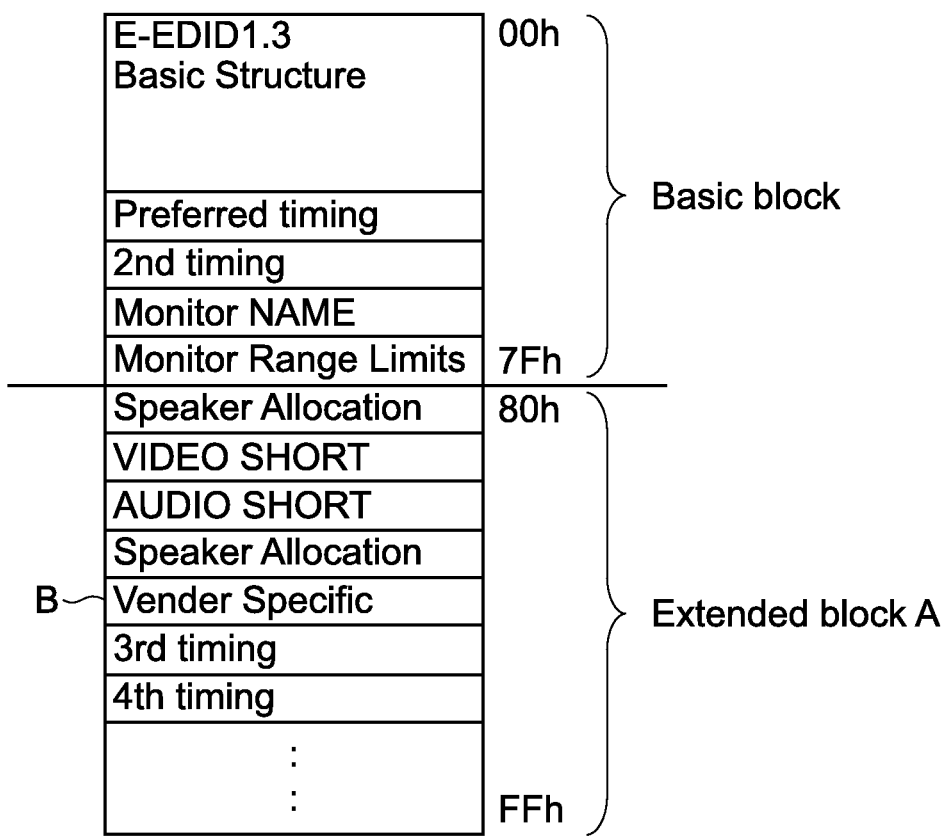
FIG. 5 is a diagram showing a data structural example of EDID in a case where a sink device shown in FIG. 4 has a function capable of accessing network content.

FIG. 5 is a diagram showing a data structural example of EDID in a case where the sink device 300 has a function capable of accessing network content. As shown in FIG. 5, in an extended block A of EDID, a "Vendor Specific" area B is set as an area uniquely defined by a vendor.

FIG. 6 is a diagram showing one example of the "Vendor Specific" area B in detail. In the first byte "Byte 0", a value (0x03) showing that the data format is "Vendor Specific", and a data length of the "Vendor Specific" area B are written. In the second to fourth bytes "Byte 1" to "Byte 3", an IEEE registered manufacturer code is written. In the fifth and sixth bytes "Byte 4" and "Byte 5", physical addresses are written.

To the seventh byte "Byte 6", bits showing functions supported by the sink device 300 are allocated. Bit 7 in "Byte 6" shows an audio data format, and Bit 6 to Bit 4 show support of Color Depth. Bit 3 shows support of video YCbCr (4:4:4) format, and Bit 0 shows support of DVI (Digital Visual Interface) dual link.

In this embodiment, in order to show that the TV apparatus 300 as the sink device 300 is capable of obtaining content from the Internet 900 and reproducing the content, an "IPTV" flag C is newly defined in Bit 1.

In Step 3 in FIG. 4, in a case where the "IPTV" flag C in the EDID of the sink device 300 is valid, the following sequence is executed. First, content in the Internet 900 is obtained by the mobile terminal 400 as the source device 400 and reproduced. In order to do so, the mobile terminal 400 is connected with the server 950 in the Internet 900 via the home gateway 250, and sends a content obtaining request (Step 4). The obtaining request contains, for example, a URL (Uniform Resource Locator) being address information on the content in the Internet 900 and file name information.

The server 950 file-transmits the specified content in a streaming or download format (Step 5). The mobile terminal 400 receives the transmitted file, and the display section 410 or the loudspeaker 413 reproduces the file.

Here, an instruction to cause the sink device 300 to display and show content that the source device 400 has displayed and shown is input from a user. That is, an instruction to cause the sink device 300 to take over reproduction of the content is input to the input section 420 of the source device 400 from a user. In this case, the source device 400 confirms the state of the sink device 300 by using HDMI-CEC commands "Give Device Power Status (0x8F)" and "Give Tuner Device Status (0x08)" (Step 6).

In a case where the "IPTV" flag C of the EDID is valid, the source device 400 transmits a control signal obtained by adding content-access-information containing the URL of the content to the HDMI-CEC control signal, that is, a reproduction-takeover-command according to this embodiment, to the sink device 300. As a result, a command obtained by extending HDMI-CEC "Tuner Control" is used by the source device 400, Therefore, the sink device 300 is controlled (Step 7).

FIG. 7 are diagrams showing one example of an extended HDMI-CEC command. As shown in FIG. 7A, an opcode "0x92" is used for selection of analog broadcasting, and an opcode "0x93" is used for selection of digital broadcasting.

In this embodiment, to obtain content in the Internet, an opcode "0x94" D is newly given. In the opcode "0x94" D, the URL of ASCII (American Standard Code for Information Interchange) code having 32-byte length is specified as the operand.

Under the HDMI-CEC standard, the length of an operand is often limited to 14 bytes. However, to specify a URL, it is necessary that the operand has a length equal to or more than 14 bytes. Therefore, as shown in FIG. 7B, the length of the operand is 32 bytes in this embodiment.

In Step 7 in FIG. 4, in accordance with HDMI-CEC protocol, the source device 400 divides the URL data into three different CEC packets, and transmits the packets. As shown in FIG. 7B, to the first byte in the operand, a serial number showing the sequence of the three CEC packets is allocated.

The sink device 300 side recognizes the opcode "0x94" D and the serial number. Further, the three CEC packets transmitted at different timings are received, and the data end code in the third CEC packet is determined. As a result, the URL data is reconstructed.

Since ASCII codes "0x20" to "0x7E" are alphabetical characters and digits, if the data end code is define as "0xFF", for example, the data end code is easily determined. Note that it has been described that the number of characters of the URL data length is 32. However, depending on the combination of the opcode "0x94" D and header information on the serial numbers, the number of characters is not limited to 32, and URL data may be transmitted. As a result, URL data having a large data length may be added to an HDMI-CEC control signal.

In accordance with the extended "Tuner Control" command, the sink device 300 requests the server 950 in the Internet 900 to transmit files while specifying content to be obtained (Step 8). In this case, content may be specified according to the display capability of the sink device 300.

In accordance with the request from the sink device 300, the server 950 transmits files of the specified content (Step 9). The sink device 300 receives the transmitted files, and reproduces the files on the display panel 310.

A user inputs an instruction to finish reproducing the content by the sink device 300 to the input section 420 of the source device 400. In this case, in order to return the sink device 300 to a state of the state information obtained in Step 6, an HDMI-CEC command from the source device 400 is transmitted (Step 10). As a result, the sink device 300 finishes displaying the Internet content.

Figure 8:
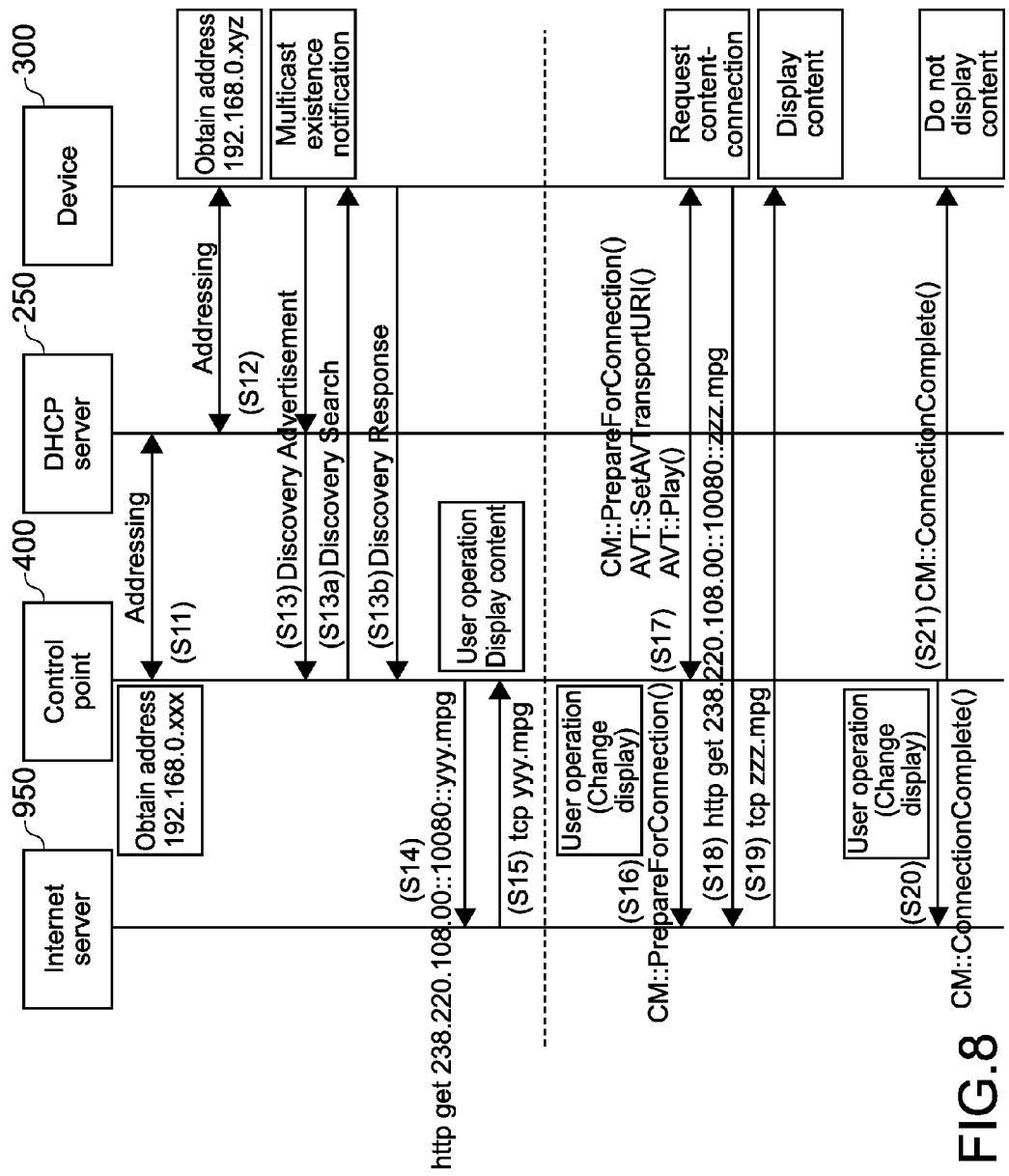
FIG. 8 is a sequential diagram schematically showing a control-sequential example between the TV apparatus and the mobile terminal via a local network in a network system shown in FIG. 1.

FIG. 8 is a sequential diagram schematically showing a control-sequential example between the TV apparatus 300 and the mobile terminal 400 through the local network 200 or the Wi-Fi connection 210 in the network system 100 according to this embodiment.

Here, by using a UPnP control message, apparatuses in the local network 200 or in the Wi-Fi connection 210 are controlled. As shown in FIG. 8, hereinafter, the mobile terminal 400 will sometimes be referred to as control point 400 as a controller-side apparatus. Further, the TV apparatus 300 will sometimes be referred to as device 300 as a controlled-side apparatus.

In this embodiment, the home gateway 250 functions as a DHCP (Dynamic Host Configuration Protocol) server that allocates addresses to the respective apparatuses in the same private address (hereinafter, sometimes referred to as DHCP server 250). Alternatively, the control point 400 or the device 300 may have an Auto IP function.

Each of the control point 400 and the device 300 connected with the local network 200 or the Wi-Fi connection 210 obtains a private address from the DHCP server 250 (Step 11, Step 12).

The device 300 that obtained the address broadcasts (Discovery Advertisement) its existence to the apparatuses in the local network 200 or the Wi-Fi connection 210 by using an SSDP (Simple Service Discovery Protocol) NOTIFY message (Step 13). As a result, the control point 400 is capable of confirming if the device 300 is capable of obtaining content in the Internet 900 and reproducing the content.

Other than the broadcast notification (Step 13), a method using Discovery Search (Step 13a) and Discovery Response (Step 13b), with which the control point 400 confirms functions of all the apparatuses in the local network 200 or the Wi-Fi connection 210, may be used. In this case, the control point 400 multicasts an SSDP M_SEARCH message by using HTTPMU (HTTP Multicast over UDP). Further, the device 300 that receives the message notifies an UDP response including an SSDP header.

FIG. 9 is a diagram showing an XML (Extensible Markup Language) expression example describing functions that the device 300 has, notified by using the Discovery Advertisement (Step 13) or the Discovery Response (Step 13b).

In this embodiment, in the XML description shown in FIG. 9, functions of the device 300 capable of obtaining content in the Internet and reproducing the content are described. Therefore, in this embodiment, "InternetTuner" is added as definition of the new service, and is described in combination with other information. Portion E surrounded by a dotted line in FIG. 9 is the description added in this embodiment. Because of the Discovery information, it is possible to determine if the device 300 has a capability to access content in the Internet and display the content.

A user inputs an operation to obtain content in the Internet 900 and reproduce the content to the control point 400. Then, the control point 400 is connected with the server 950 in the Internet 900, and a request to obtain content selected by a user is executed (Step 14).

The server 950 file-transmits the specified content in a streaming or download format (Step 15). The control point 400 receives the transmitted files, and the display section 410 or the loudspeaker 413 reproduces the files.

In a case where the "InternetTuner" service of the device 300 is valid, subsequently, the following sequence is executed. First, an instruction to cause the device 300 to display and show content that the control point 400 has displayed and shown is input from a user. That is, an instruction to cause the device 300 to take over reproduction of the content is input to the input section 420 of the control point 400 from a user. In this case, the control point 400 transmits a command for connection preparation "PrepareForConnection" to the server 950 (Step 16).

Next, the control point 400 transmits a control message obtained by adding content-access-information including content URL to a UPnP control message, that is, a reproduction-takeover-command according to this embodiment, to the device 300. As a result, the control point 400 uses a command obtained by extending UPnP "AVTransport::Play( )". Therefore, the device 300 is controlled (Step 17).

A command is Posted on an address described in "Control URL" that shows control of "InternetTuner" service shown in FIG. 9 by using SOAP (Simple Object Access Protocol). Therefore, the device 300 may be controlled.

FIG. 10 is a diagram showing a command example of the extended UPnP "AVTransport::Play( )". Portions $F_1$-$F_7$ surrounded by dotted lines in FIG. 10 are the descriptions added in this embodiment.

As shown in FIG. 10, in "AVTransport::Play( )" command, the global address and the file name of content (Global Address+file name) are described (refer to portions $F_3$ and $F_6$). Because of the described information, the device 300 is capable of selecting, obtaining, and reproducing content in the Internet.

Further, as shown in FIG. 10, in this embodiment, an absolute time representing the absolute time of content is described (refer to portion $F_7$). The device 300 that obtains the content may specify a position in the content at which reproduction is to be started. As described above, an extended UPnP control message as the reproduction-takeover-command may include time information on content. As a result, for example, in a case where the server 950 supplies content under the VOD system, the content may be obtained user-friendly.

In accordance with "AVTransport::Play( )" command from the control point 400, the device 300 requests the server 950 to transmit content (Step 18). The server 950 transmits the specified content to the device 300 by using TCP or UDP protocol. The device 300 reproduces the received content on the display panel 310 and the like.

An instruction to finish reproducing the content by the device 300 is input to the input section 420 of the control point 400 from a user. In this case, the control point 400 transmits "ConnectionComplete( )" command to instruct to stop transmission to each of the server 950 and the device 300 (Step 20, Step 21). As a result, the device 300 finishes displaying the Internet content.

Figure 11:
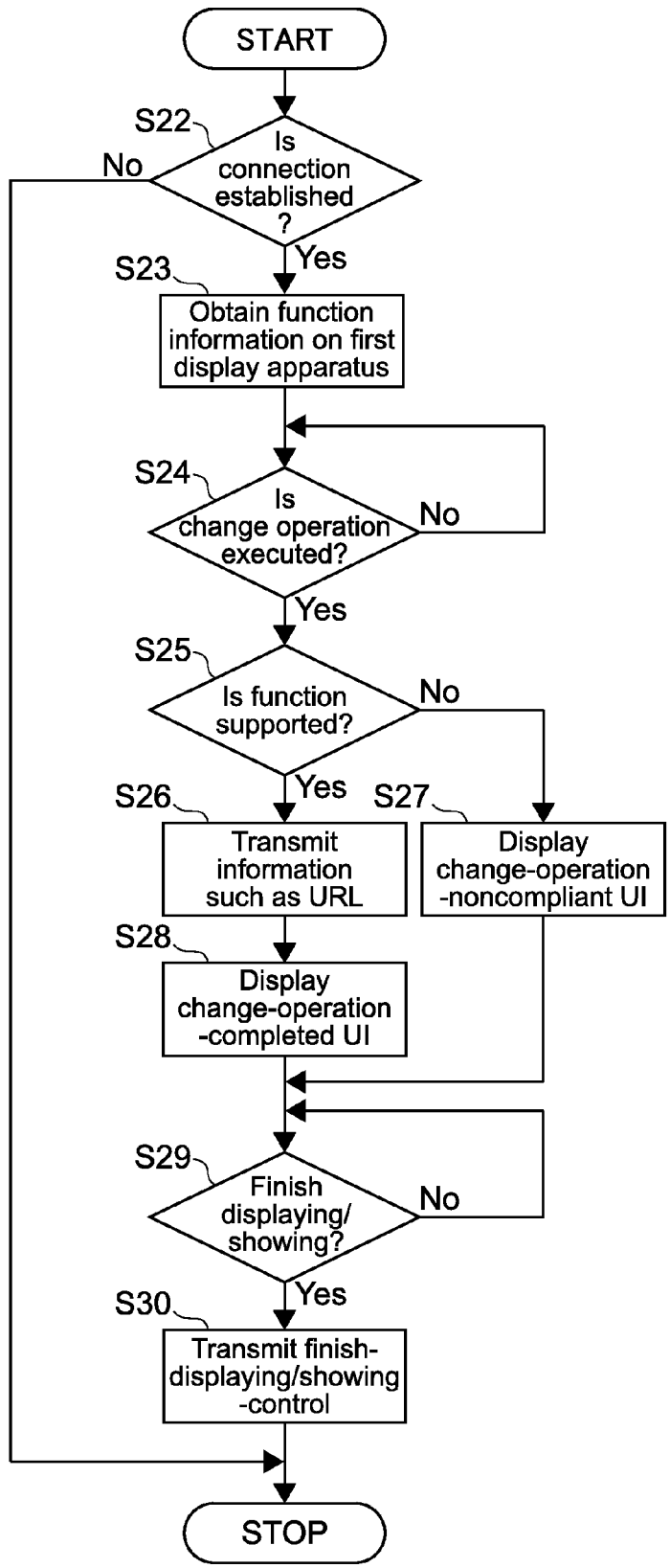
FIG. 11 is a flowchart showing one example of an operating procedure at the mobile terminal side that transmits a reproduction-takeover-command of this embodiment.

FIG. 11 is a flowchart showing one example of an operating procedure at the mobile terminal 400 side that transmits a reproduction-takeover-command. FIG. 11 shows the basic operating procedure of the mobile terminal 400 common to the respective sequential diagrams of FIG. 4 and FIG. 8.

The mobile terminal 400 determines if the mobile terminal 400 is connected with the TV apparatus 300 (Step 22). In a case where the mobile terminal 400 is not connected with the TV apparatus 300, the processing is completed. In a case where the mobile terminal 400 is connected with the TV apparatus 300, it is determined if the TV apparatus 300 is capable of obtaining and reproducing the Internet content. The function of the TV apparatus 300 is confirmed by obtaining EDID or UPnP device information (Step 23). Note that the function of the TV apparatus 300 is stored in a predetermined storage area of the mobile terminal 400.

It is determined if an instruction to change from reproduction of content by the mobile terminal 400 to reproduction of the content by the TV apparatus 300 is input from a user or not (Step 24). In a case where the change instruction is not input, the determination processing of Step 24 is repeated (No in Step 24). In a case where the change instruction is input, based on the function information on the TV apparatus 300 obtained in Step 23, the function of the TV apparatus 300 is determined. That is, it is determined if the TV apparatus 300 has a function to display the Internet content that the mobile terminal 400 displays and shows (Step 25).

In a case where the TV apparatus 300 does not have the function, a user is informed that the change operation is impossible. For example, on the display section 410 of the mobile terminal 400, a change-operation-noncompliant UI (User Interface) such as a warning is displayed (Step 27). In a case where the TV apparatus 300 has the function, by using an extended HDMI-CEC control signal or an extend UPnP control message signal, information necessary for the change processing is transmitted to the TV apparatus 300 (Step 26).

A UI for notifying a user that the change processing has been executed is displayed on the display section 410 of the mobile terminal 400 (Step 28). After that, a UI to finish reproduction of the content by the TV apparatus 300 may be displayed. For example, an input button or the like operable by a user is displayed.

When the content is displayed and shown by the TV apparatus 300, it is determined if an instruction to finish displaying and showing the content by the TV apparatus 300 is input to the mobile terminal 400 by a user (Step 29). In a case where the finish instruction is not input, the determination processing of Step 29 is repeated (No in Step 29). In a case where the finish instruction is input, the mobile terminal 400 transmits an HDMI-CEC command or a UPnP "AVTranspot::Stop( )" command to the TV apparatus 300 to finish displaying and showing (Step 30). As a result, the processing is completed. Alternatively, the processing of determining a change instruction from a user (Step 24) may be repeated.

As described above, the network system 100 according to this embodiment includes the mobile terminal 400 and the TV apparatus 300 as at least two information processing apparatuses capable of obtaining content from the Internet 900 and reproducing the content. Further, the mobile terminal 400 reproducing content transmits a reproduction-takeover-command to the TV apparatus 300. The TV apparatus 300 which has received the reproduction-takeover-command obtains the content from the Internet 900 and reproduces the content. As a result, in the local network 200, content in the Internet 900 may be user-friendly controlled.

Further, content displayed and shown by the mobile terminal 400 may be continuously displayed and shown by the TV apparatus 300 through an easy operation to the mobile terminal 400. Further, because of so-called 3-BOX control of DLNA enabling control of content in a local address, content in the Internet 900 may be controlled. The control may be realized without adding a special function to the home gateway 250 shown in FIG. 1.

Further, because of extension of HDMI-CEC, it is possible to instruct to obtain and reproduce the Internet content by an easy method. For example, by using interfaces such as HDMI, content is transmitted from the mobile terminal 400 to the TV apparatus 300. As described above, the reproduction resolution of the mobile terminal 400 is lower than the reproduction resolution of the TV apparatus 300. Therefore, content in conformity with the reproduction resolution of the mobile terminal 400 is transmitted to the TV apparatus 300 by using the baseband or the like. As a result, it is necessary for the TV apparatus 300 to perform scaling processing, and there is a fear that the optimum display quality is not obtained. However, in this embodiment, the TV apparatus 300 may obtain content from the Internet 900 and reproduce the content. As a result, it is not necessary to perform scaling processing, and the optimum display quality may be obtained.

Modified Example

The embodiment of the present disclosure is not limited to the above-mentioned embodiment, but may be variously modified.

In the above-mentioned embodiment, the mobile terminal 400 is PtoP connected with the TV apparatus 300 via interfaces in conformity with HDMI standard or Wi-Fi standard. Further, access to the server 950 in the Internet 900 is instructed between the mobile terminal 400 and the TV apparatus 300. However, those apparatuses may be directly PtoP connected through interface sections other than HDMI standard or Wi-Fi standard. In this case, in Step 3 shown in FIG. 4, data similar to EDID having the data structure shown in FIG. 5 may be used.

In the above-mentioned embodiment, an instruction to obtain content in the Internet 900 is issued by using a UPnP control message in the local network 200 in conformity with DLNA standard. However, an instruction to obtain content in the Internet 900 may be issued by sending/receiving a reproduction-takeover-command in a local network not in conformity with DLNA standard.

Note that the above-mentioned data processing between the TV apparatus 300 and the mobile terminal 400 is realized by cooperation of software stored in storage areas such as the Flash ROMs 303 and 403 and hardware resources of the TV apparatus 300 and the mobile terminal 400. For example, the CPU 302 or 402 loads a program structuring software stored in the storage area or the like into the DRAM 304 or 404 to execute it. Therefore, various kinds of data processing are realized. As described above, the CPU 302 functions as a command executing section. Further, each of the CPUs 302 and 402 functions as a content obtaining-and-reproducing section.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
an input section configured to receive an instruction from a user to cause an other information processing apparatus to take over reproduction of content provided through a global network; and
a sending section configured to transmit to the other information processing apparatus, when the instruction is received by the input section, a reproduction-takeover-command including content-access-information necessary to obtain the content from the global network,
in which the apparatus is connected to the other information processing apparatus via a high definition multimedia interface (HDMI),
in which the apparatus and the other information processing apparatus are connected to a local network, and
in which the sending section is configured to transmit the reproduction-takeover-command to the other information processing apparatus by way of the high definition multimedia interface;
wherein the reproduction-takeover-command comprises an opcode and an operand, the operand includes multiple bytes and is transmitted in the form of multiple packets, and the first byte of the operand includes a serial number showing the sequence of the multiple packets.

2. The apparatus as recited in claim 1, wherein the reproduction-takeover-command is an extended HDMI-Consumer Electronics Control (HDMI-CEC) control signal.

3. The apparatus as recited in claim 1, wherein the local network is in conformity with the Digital Living Network Alliance (DLNA) standard.

4. The apparatus as recited in claim 1, wherein the reproduction-takeover-command is an extended Universal Plug and Play (UPnP) control message signal.

5. An information processing apparatus, comprising:
a receiving section configured to receive a reproduction-takeover-command from an other information processing apparatus, the reproduction-takeover-command including content-access-information necessary to obtain content from a global network; and
an executing section configured to execute the received reproduction-takeover-command,
in which the apparatus is connected to the other information processing apparatus via a high definition multimedia interface (HDMI),
in which the apparatus and the other information processing apparatus are connected to a local network, and
in which the receiving section is configured to receive the reproduction-takeover-command from the other information processing apparatus by way of the high definition multimedia interface;
wherein the reproduction-takeover-command comprises an opcode and an operand, the operand includes multiple bytes and is transmitted in the form of multiple packets, and the first byte of the operand includes a serial number showing the sequence of the multiple packets.

6. The apparatus as recited in claim 5, wherein the reproduction-takeover-command is an extended HDMI-Consumer Electronics Control (HDMI-CEC) control signal.

7. The apparatus as recited in claim 5, wherein the local network is in conformity with the Digital Living Network Alliance (DLNA) standard.

8. The apparatus as recited in claim 5, wherein the reproduction-takeover-command is an extended Universal Plug and Play (UPnP) control message signal.

9. A network system, comprising: a first information processing apparatus and a second information processing apparatus; and a gateway to connect a local network to a global network having a source of content, wherein each of the first information processing apparatus and the second information processing apparatus are connected to the gateway by way of the local network which conforms to a predetermined network standard, the first information processing apparatus and the second information processing apparatus are directly connected to each other by way of a high definition multimedia interface (HDMI), the first and second information processing apparatuses are operable to obtain content from the global network via the gateway and to reproduce the content, the first information processing apparatus comprises: an input section configured to receive an instruction from a user to cause the second information processing apparatus to take over reproduction of the content, and a sending section configured to transmit to the second information processing apparatus by way of the high definition multimedia interface, when the instruction is received by the input section, a reproduction-takeover command including content-access-information necessary to obtain the content from the global network, and the second information processing apparatus comprises: a receiving section configured to receive the reproduction-takeover-command, and an executing section configured to execute the received reproduction-takeover-command;
   wherein the reproduction-takeover-command comprises an opcode and an operand, the operand includes multiple bytes and is transmitted in the form of multiple packets, and the first byte of the operand includes a serial number showing the sequence of the multiple packets.

* * * * *